Sept. 24, 1968 K. H. FRIELINGHAUS ET AL 3,403,382

CODE COMMUNICATION SYSTEM WITH CONTROL OF REMOTE UNITS

Filed June 8, 1965 4 Sheets-Sheet 1

INVENTORS
K.H.FRIELINGHAUS,
A.W.WETMORE & L. APPLEMAN
BY

Forest B. Hitchcock

THEIR ATTORNEY

Sept. 24, 1968 K. H. FRIELINGHAUS ET AL 3,403,382

CODE COMMUNICATION SYSTEM WITH CONTROL OF REMOTE UNITS

Filed June 8, 1965 4 Sheets-Sheet 2

INVENTORS
K. H. FRIELINGHAUS
A. W. WETMORE & L. APPLEMAN
BY Forest B. Hitchcock
THEIR ATTORNEY

CODE COMMUNICATION SYSTEM WITH CONTROL OF REMOTE UNITS

Filed June 8, 1965 4 Sheets-Sheet 4

INVENTORS
K.H. FRIELINGHAUS
A.W. WETMORE & L. APPLEMAN
BY
Forest B. Hitchcock
THEIR ATTORNEY 3,403,382
CODE COMMUNICATION SYSTEM WITH CONTROL OF REMOTE UNITS Klaus H. Frielinghaus, Arthur W. Wetmore, and Larry Appleman, Rochester, N.Y., assignors to The General Signal Corporation, Rochester, N.Y., a corporation of New York Filed June 8, 1965, Ser. No. 462,300
9 Claims. (Cl. 340—172.5)

ABSTRACT OF THE DISCLOSURE

A code communication system having a transmitter at a central office sending messages having a function and address to remote parallel field stations. A receiver at each field station responsive to a particular address for supplying function information to utilization equipment. Transmitters at each field station responsive to a distinctive signal from the central office transmitter for cyclically sequentially transmitting in a predetermined order indication messages from the field station representative of the condition of the utilization equipment, each such message having a function and address. A plurality of storage memories at the central office for storing the information received from each field station and checking means for preventing storage of information from each field station in other than the particular memory device associated with that station.

This invention relates to code communication systems, and more particularly to a duplex communication system wherein a plurality of field stations receive binary coded control signals selectively from a control office and the field stations provide binary coded indication information to the control office sequentially in a roll call fashion upon detection of a pause in data transmission from the control office for longer than a predetermined duration.

In supervisory control systems, it is desirable to maintain periodically updated information regarding the condition of each field station, while also retaining the capability of selectively controlling the field stations from a central control point. The novel system disclosed herein accomplishes this objective by transmitting a distinctive signal from a central control point, constituting the unshifted, or center frequency of a frequency shift keying transmitter, for a predetermined duration. This signal elicits a response from each of the field stations, sequentially, in accordance with a pre-established priority. These responses continue endlessly, in cyclical fashion, with the response from each field station being separately stored within respective portions of a storage means.

One problem peculiar to a system of this type arises when a field station, for any reason whatever, fails to respond. Under such circumstances, there is a pause in the continuing responses from the field stations, during which no message is registered as having been received at the control office. Receipt of subsequent messages by the control office would then be rejected, since the address on each incoming message would indicate lack of correspondence with the number of messages counted as having been received from the field stations. To prevent such occurrence, means have been provided at the control office for advancing the number of messages counted, by one, during each period in which a field station fails to transmit to the control office.

In accordance with the foregoing, one object of this invention is to provide a high speed, duplex, supervisory control system for transmitting digital data from a control office to a plurality of field stations and from each of the field stations to the control office, utilizing but a single clock for regulating the rate of operation of the entire system.

Another object is to provide a duplex code communication system including a control office and a plurality of field stations wherein the control office transmits selectively to one or more of the field stations, and the field stations continually transmit to the control office in sequence according to a predetermined priority.

Another object is to provide a code communication system having a control office and a plurality of field stations transmitting to the control office in succession, wherein the control office always associates a received message with the proper originating field station even when one or more of the field stations become inoperative.

Another object is to provide a code communication system having means for avoiding erroneous operation by rejecting messages which contain either more or less than a predetermined number of digital bits.

The invention contemplates a code communication system comprising means for transmitting coded messages, each said message including a function portion and a distinctive address portion, and a plurality of field stations, each said field station being responsive to a particular one of said distinctive address portions of said coded messages and supplying the function portion of the message to the utilization apparatus. At each of the field stations, means are provided which are responsive to a distinctive signal from the transmitting means for sequentially transmitting indication messages from each of the field stations representative of the condition of said utilization apparatus, each said indication message including a function portion and a distinctive address portion. A plurality of storage means are also provided, each said storage means being associated with a separate field station respectively. The novel system also includes means responsive to the address portions of the messages transmitted by the field stations for selectively storing the function portion of each message in an individual portion of said storage means, upon receipt thereof. In addition, timing means are provided for monitoring intervals between consecutive messages received from the field stations for selectively supplying to a storage means subsequent to said individual portion of said storage means the function portion of each succeeding indication message when one of the intervals exceeds a predetermined duration.

The foregoing and other objects and advantages of the invention will become apparent from the following detailed description when read in conjunction with the accompanying drawings, in which:

FIGS. 1A and 1B, when placed side-by-side, represent a functional block diagram of the entire code communication system.

Figure 1A:
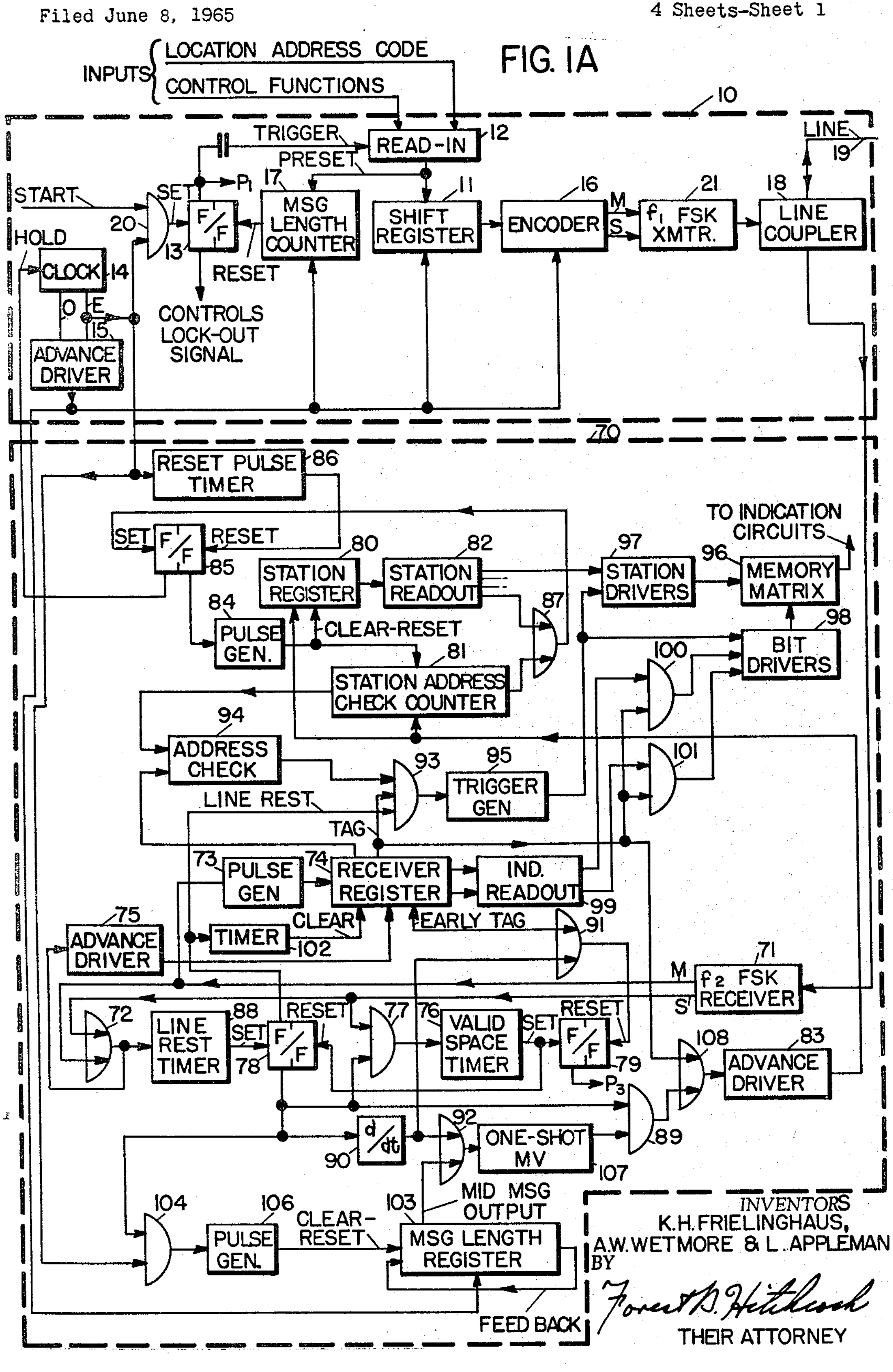
Figure 1B:
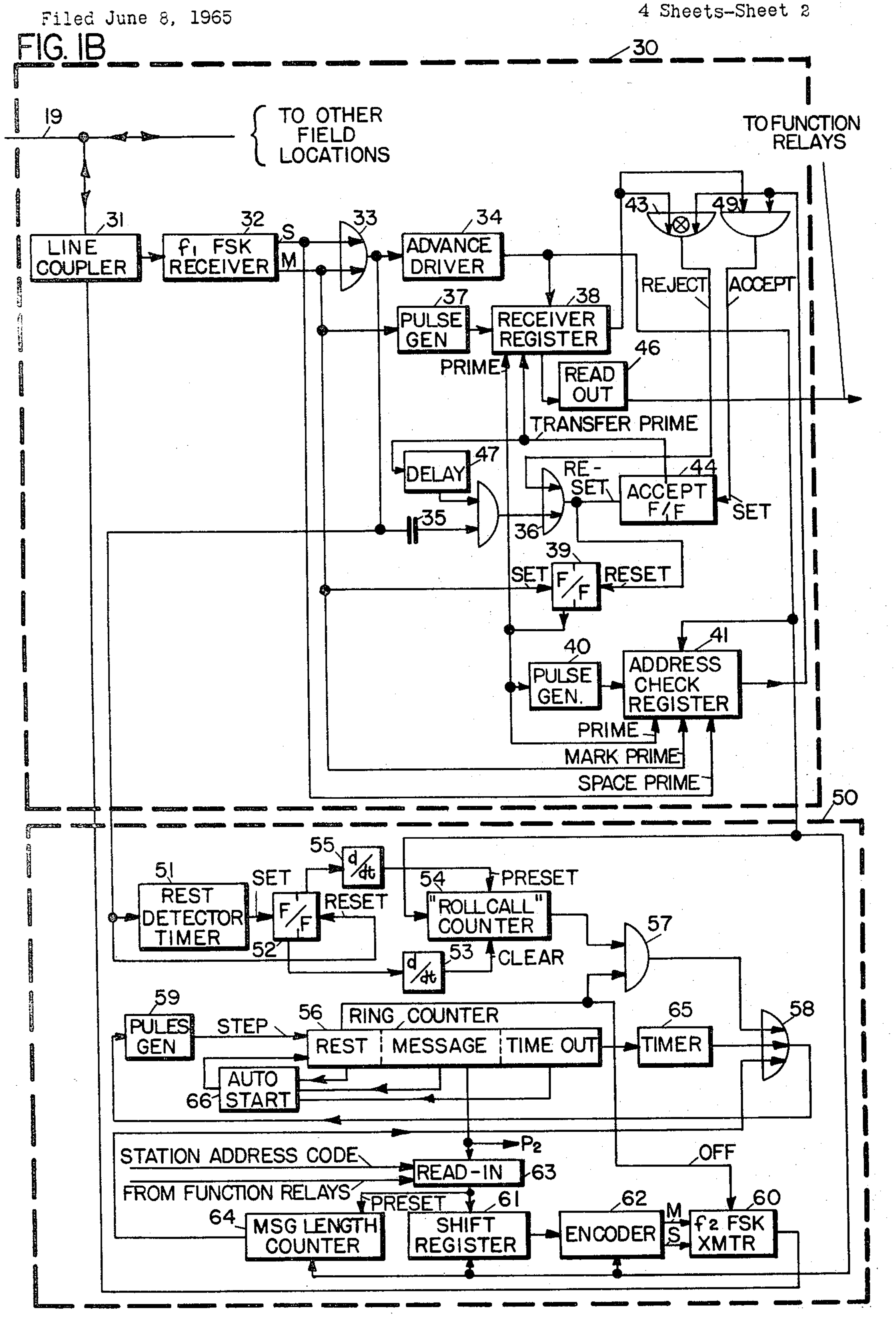

Turning first to FIGS. 1A and 1B, the novel code communication system is seen to comprise an office transmitter and an office receiver communicating with a plurality of field stations, each field station including transmitting and receving circuitry .

Office transmitting circuitry 10 comprises a shift register 11, which functions as three separate shift registers connected in series. A shift register of this type is shown in W. R. Smith et al. U.S. patent application Ser. No. 374,918, filed June 15, 1964. As in the aforementioned Smith et al. application, the address is split between the first five bits and last five bits of the message, and is of a three-out-of-five code nature to provide validity checking as well as addressing. The data desired to be communicated to a particular field station is contained in the middle twenty bits, so that the entire message comprises thirty bits. Thus, the end portions of shift register 11 comprise the address portion thereof, while the center portion comprises the function portion thereof.

Data is read into shift register 11 in parallel through read-in circuits 12. These circuits preferably comprise diode-selected coding lines, which are well-known in the art. The read-in circuits are controlled by the output of a flip-flop circuit 13, transferring data to shift register 11 when the flip-flop is in the set condition.

The time base for the entire code communication system is controlled from a single clock 14. This clock produces alternate pulses designated "O" pulses and "E" pulses, at a constant rate. At any given instant, either an "O" or an "E" pulse is generated by the clock. Both the "O" and "E" pulses are supplied to an advanced driver 15, which differentiates each of these pulses in order to provide a sharp output voltage spike corresponding to each of the respective clock pulses.

Each "E" and "O" drive spike produced by advance driver 15 is supplied to shift register 11, as well as to an encoder 16 and a message length counter 17. The message length counter is preset to a count of thirty-one by output from read-in circuits 12. Upon reaching count thirty-one, message length counter 17 resets flip-flop circuit 13. In addition, output pulses produced by shift register 11 are supplied to encoder 16, which produces marks and spaces in accordance with the output of shift register 11. More particularly, each shift register output pulse produces a mark output from encoder 16, while each omission of a shift register output pulse causes encoder 16 to produce a space output. The output from shift register 11 is serially coupled to encoder 16. It should be noted that read-in circuits 12 are connected to shift register 11 to always establish a binary ONE in the initial stage of the shift register, so that the first pulse produced by the encoder is always a mark. The mark and spaced pulses produced by the encoder are supplied to a frequency shift keying (hereinafter abbreviated FSK) transmitter 21, the output of which is supplied to a communication circuit 19 through a line coupler 18, which preferably comprises an impedance matching transformer. The center, or unshifted output frequency of transmitter 21 is designated $f_1$. Communication circuit 19 is coupled to subsequent field station transmitters and receivers, such as receiver 30.

Transmission from the office is initiated by application of a start pulse to a first input of an AND circuit 20. A second input of the AND circuit is fulfilled by "E" pulses from clock 14. Thus, upon simultaneous occurrence of a start pulse and an "E" pulse from clock 14, AND circuit 20 sets flip-flop circuit 13, thereby triggering read-in circuits 12 to initiate transfer of data supplied from location address code and control function inputs, in parallel, into shift register 11. In addition, since shift register 11 is preferably of the multiaperture core variety, such as illustrated in the aforementioned Smith et al. application, a prime signal $P_1$ is supplied thereto from flip-flop circuit 13 when in the set condition, thereby activating shift register 11 in a manner described in the aforementioned Smith et al. application. Moreover, in order to avoid erroneous application of control function inputs to read-in circuits 12 while shift register 11 contains a message which has not yet been completely transmitted, it may be desirable to supply a controls lock-out signal from flip-flop circuit 13, when in the set condition, in order to deenergize the control inputs until such time as the entire message has been transmitted.

Once read-in circuits 12 have been triggered by flip-flop circuit 13, the message is transferred into shift register 11, and message length counter 17 is preset to a count of thirty-one. Each subsequent "E" spike produced by advance driver 15 drives shift register 11 to serially transfer a bit from the shift register into encoder 16, which produces either a mark pulse or a space pulse in accordance therewith, upon occurrence of the next successive "O" spike. Because each bit stored in the shift register must also be shifted through the encoder prior to transfer to the transmitter, a delay equivalent to that required for transfer of a bit through an additional stage is required, in order to transfer the entire message to the transmitter. This may be seen in greater detail in FIG. 2. Each "E" spike supplied to message length counter 17 counts the counter down until finally, after the thirty-first spike, the message has passed through the encoder and the message length counter produces an output which resets flip-flop circuit 13, removing the prime signal from shift register 11. In addition, the controls lock-out signal is removed, and read-in circuits 12 are deenergized.

FSK transmitter 21 is constructed to transmit a pulse of frequency above its center frequency for a space, a pulse of frequency below its center frequency for a mark, and its center frequency whenever neither a mark nor space is to be produced. In the absence of an output from shift register 11, each "E" spike produced by advance driver 15 transfers a space pulse from encoder 16 to FSK transmitter 21. Thus, when no message is being transferred from shift register 11 into encoder 16, FSK transmitter 21 produces a series of space pulses.

Turning now to receiving circuitry 30, situated at a typical field station, frequency shift keying pulses are received through a line coupler 31, which preferably comprises an impedance matching transformer, by a frequency shift keying receiver 32. This receiver, which is tuned to a center frequency $f_1$, produces a space output upon receipt of a pulse of frequency above the center frequency, and a mark output upon receipt of a pulse of frequency below the center frequency. Both mark and space outputs are supplied through an OR circuit 33 to an advance driver circuit 34 which performs a function similar to that of advance driver 15 in office transmitting circuitry 10. In addition, output of OR circuit 33 is A.C. coupled through a capacitor 35 to the first input of an AND circuit 36.

Each mark output produced by FSK receiver 32 drives a pulse generator 37, which, in turn, supplies a binary ONE bit in serial fashion to a receive shift register 38 for each received mark pulse, respectively. Receive register 38, which comprises a thirty bit register, is preferably similar in construction to shift register 11 of the office transmitting circuitry, and therefore is driven by advance driver 34. Serial transfer of bits within shift register 38 from one stage to the next is controlled by prime current from a flip-flop circuit 39.

The first mark pulse produced by receiver 32 at the beginning of each control message (the tag bit) sets flip-flop 39, producing an output which is supplied to a pulse generator 40. The pulse generator thus supplies a single binary ONE bit to an address check shift register 41. Following mark pulses produced by receiver 32 attempt to set the already set flip-flop 39, but no further outputs are produced by flip-flop 39 by these following mark pulses. Both receive shift register 38 and address check shift register 41 are driven in unison by the reconstructed clock signal supplied by advance driver 34 on lead 42.

Because address check shift register 41 is preferably comprised of multiaperture cores, the cores of the shift register require prime currents in order to serially transfer the single bit from one stage to the next. These prime currents are supplied from the mark and space outputs of FSK receiver 32, and are connected in a predetermined pattern to the cores of shift register 41. Thus, reception of mark and space pulses, in a predetermined order, conditions address check shift register 41 for successful shifting of the single check bit through the entire length of register 41.

Serial outputs of both receive shift register 38 and address check shift register 41 are supplied to accept-reject logic circuitry comprising a two input EXCLUSIVE OR circuit 43 having its inputs connected in parallel with those of a two input AND circuit 49. The accept-reject logic circuitry detects the tag bit, or binary ONE, when the entire received message has been completely shifted into receive shift register 38 and the single tag check but has been completely shifted through the address check shift register 41, simultaneously. In response thereto, accept flip-flop circuit 44 is switched into its set condition by output from AND circuit 49, initiating a transfer prime current which allows the control message to be transferred from receive shift register 38 into a read-out unit 46. This unit operates function relays in accordance with the received message, and may comprise of controlled rectifiers rendered conductive for a predetermined timed interval by output from AND circuit 49. In addition, the reset output from accept flip-flop circuit 44 is supplied through a delay circuit 47 to the second input of AND circuit 36. The next space output produced by receiver 32 thus fulfills the first input to AND circuit 36 simultaneous with output from delay circuit 47. Thus, AND circuit 36 provides an output to a first input of an OR circuit 48, which thus resets accept flip-flop circuit 44 and resets flip-flop circuit 39.

In the event a tag bit is detected, at the end of a received message, in either receive shift register 38 or address check shift register 41, but not both concurrently, a reject signal is supplied by EXCLUSIVE OR circuit 43 to a second input of OR circuit 48, which, in turn, immediately attempts to reset accept flip-flop circuit 44 and resets flip-flop circuit 39. Thus, accept flip-flop 44 never applies parallel transfer prime current to receive shift register 38, and flip-flop 39 removes interstage serial transfer prime current from receive shift register 38. The next pulse then produced by advance driver 34 clears receive register 38, thereby erasing the bit content therein. Since prime current is also supplied by flip-flop circuit 39 to address check shift register 41, resetting of flip-flop circuit 39 also serves to remove prime current from the address check shift register, so that the next output pulse produced by advance driver circuit 34 clears the address check shift register, thereby erasing the bit content therein.

In operation, assume that a message is transmitted to the field station from the office. Since the code begins with a mark pulse representing a tag bit, a mark is the first output pulse produced by receiver 32. This mark, which is supplied to receive shift register 38 through pulse generator 37, also switches flip-flop circuit 39 into the set condition. Since flip-flop circuit 44 is in the reset condition at this time, due to output of delay circuit 47, as previously described, prime current is supplied to receive shift register 38 and address check shift register 41 from flip-flop circuit 39. In addition, a bit, representing the tag bit, is supplied to address check shift register 41 through pulse generator 40. The receive shift register and address check shift register are driven together in unison by the reconstructed clock signal produced by OR circuit 33. While the control code is being received, every mark from receiver 32 is supplied to receive shift register 38 through pulse generator 37. At the same time, the tag bit is shifted along in the address check shift register 41, but is maintained therein only if the address check shift register is properly conditioned before each shift. The conditioning signals comprise the mark prime and space prime pulses supplied in a predetermined pattern to the address check shift register from the receiver by connecting either the mark prime or space prime lead to the individual prime windings on the multiaperture cores of the register. This pattern is different at each field station, in order to represent the particular address individual to the station. Hence, for the called-for field location, the tag bit is correctly preconditioned by supplying the correct prime source to the first five and the last five positions of the address check shift register 41. For example, if the tag bit is in the third position of the address check shift register, and the mark prime source is connected to the third position, the fourth bit in the control message must be a mark pulse in order to allow the tag bit to advance to the fourth position of the shift register. If the fourth bit should be a space pulse, the tag bit is not conditioned by a mark prime pulse, and is erased from the address check shift register when the next advance pulse produced by advance driver 34 is produced. In this fashion, the tag bit is maintained and shifted along the address check shift register to the end position only if the control message address code is correctly received and checks with the pattern of mark prime and space prime wiring in the address check register.

When the tag bit has shifted to the end position of receive shift register 38, the entire control message is stored in the control receive shift register. The tag bit is also in the end position of the address check shift register at this time. AND circuit 49 responds by producing an accept output signal, indicating that the received message has been received correctly and is addressed for this particular field location. The accept signal sets the accept flip-flop circuit, allowing the control message to be transferred into readout unit 46 by supplying parallel transfer prime current to receive register 38. After a slight delay, introduced by delay circuit 47, accept flip-flop circuit 44 is again reset through AND circuit 36 and OR circuit 48, as previously described.

On the other hand, if the tag bit is absent from the end position of the address check shift register during presence of the tag bit in the end position of the control receive shift register, or the tag bit is present in the end position of the address check shift register and absent from the end position of the control receive shift register, a reject output is produced by EXCLUSIVE OR circuit 43 which resets flip-flop circuit 39 through OR circuit 48. This turns off prime current in both shift registers, thereby erasing the bit content therein upon production of the next output pulse by advance driver 34. At this juncture, since accept flip-flop circuit 44 remains reset, receive shift register 38 and address check shift register 41 are both ready to receive another message.

After receipt of a control message by the field station, the field station will transmit an indication message regarding the condition of the function relays to the office at its preselected roll call time. Field station transmission circuitry 50 includes a rest detector timer 51 responsive to the reconstructed clock signal produced by OR circuit 33 of the field station receiving circuitry. When the office has received the indication message from the final field station in the supervisory control network, clock 14 of control office transmitting circuitry 10 is turned off, when in the "E" phase, for approximately 24 milliseconds. This causes the control office FSK transmitter to transmit center frequency for this period. Because the clock preferably operates at a rate of 300 bits per second, 24 milliseconds represents an abnormally long center frequency period, since seven bits would otherwise be transmitted during this interval. This abnormally long center frequency period is detected by rest detector timer 51 at each field location. One form of rest detector timer is illustrated in the aforementioned Smith et al. application U.S. Ser. No. 374,918.

When rest detector timer 51 detects the abnormally long center frequency period, an output is provided which sets a flip-flop circuit 52. The output pulse produced by flip-flop circuit 52 is differentiated through a differentiator circuit 53 and supplied to a counter designated "roll call" counter 54. Counter 54 preferably comprises multiaperture cores, so that application of a pulse from differentiator circuit 53 clears the cores of the counter, thereby resetting the counter to zero.

The first pulse produced by OR circuit 33 of the field station receiving circuitry resets flip-flop circuit 52. The pulse produced by the flip-flop circuit is differentiated through a differentiator circuit 55 and supplied to "roll call" counter 54, presetting the counter to a predetermined count. This is accomplished by pattern wiring through the cores of the counter in a manner described in the aforementioned Smith et al. application U.S. Ser. No. 374,918. The "roll call" counter of the field station required to be first to respond to the control office is preset to a count of three, so that on the third clock pulse following the abnormally long center frequency rest period, counter 54 produces an output which causes field station transmitting circuitry 50 to send an indication message to the office. Since the indication message is thirty-one bits long, for reasons described infra, and the normal rest period between messages is three clock pulses, the "roll call" counter of the second field station location to answer the control office is preset to a count of thirty-seven. Similarly, the "roll call" counter of the third field station location is preset to a count of seventy-one, and so on. It should be noted that the "roll call" counter is driven by advance driver 34 of the receiving circuitry at each field station location.

Transmission by the field station location is accomplished by means of apparatus similar to that used in the control office transmitting circuitry. The sequence of operation is controlled by a three-position open-ended ring counter 56 which starts automatically when in the first or rest position. The second position of the ring counter is designated the message position, and the final position of the counter is designated the time out position. The quiescent condition for ring counter 56 is the "rest" position. This position supplies a signal to a frequency shift keying transmitter 60, operating on a center frequency $f_2$, to maintain the transmitter in an off position. This is necessary since the field station indication network is a party line system operating on a common frequency; hence, no more than one field station FSK transmitter may be on or transmitting at any given time.

After the abnormally long center frequency pulse, representing the roll call reset signal, has occurred, "roll call" counter 54 counts clock pulses which are transmitted from the office and reconstructed by OR circuit 33. Upon reaching the preset count, an output pulse is produced by the "roll call" counter and supplied to a first input of a two input AND circuit 57. The second input to AND circuit 57 is fulfilled by an output signal from the rest position of ring counter 56. The output of AND circuit 57 is supplied to a first input of a three-input OR circuit 58, the output of which drives a pulse generator 59. Output pulses produced by pulse generator 59 cause the ring counter to step from one position to the next, advancing the bit stored in the rest position of the ring counter to the message position. Once the bit vacates the rest position, the turn off signal supplied to FSK transmitter 60 is removed, and the transmitter thus turns on. Outputs from the message position of ring counter 56 supply prime current for a shift register 61 and encoder 62, which are preferably comprised of multiaperture cores similar to shift register 11 and encoder 16 of the office transmitting circuitry. In addition, outputs from the message position of ring counter 56 trigger read-in circuits 63, which are similar in circuit configuration to read-in circuits 12 of the office transmitting circuitry. Inputs to the read-in circuits are connected to a set of code buses which are selectively energized in order to transmit ONES. The outputs or read-in circuits 63 are connected to shift register 61. At the time of read-in, a message length counter 64 is preset to a count of thirty-one by the output of read-in circuits 63. Shift register 61, encoder 62 and message length counter 64 are driven by output from advance driver 34 of the field station receiving circuitry. Shift register 61 serially produces output pulses which are supplied to encoder 62. The encoder, in turn, supplies mark or space pulses to FSK transmitter 60 in accordance with the code furnished by shift register 61.

Since the encoder initially does not contain a ONE bit, after FSK transmitter 60 has turned on, the first bit supplied to the line by the FSK transmitter is a space. As the message is shifted through the shift register and into encoder 62, the encoder changes the bits into keying pulses causing FSK transmitter 60 to change the character of the message applied to the line into low and high frequency, or mark and space pulses.

The end of the message, representing the thirty-first bit thereof, is characterized by an output from message length counter 64 which causes ring counter 56 to step into the time out position. This is accomplished by supplying a second input to OR circuit 58 from message length counter 64, thereby causing pulse generator 59 to step the ring counter from the message position to the time out position. When data is transferred out of the message position, leaving none remaining therein, prime current $P_2$, originating from the message position, is removed from shift register 61 and encoder 62. Removal of prime current from the encoder causes FSK transmitter 60 to transmit center frequency for a period of time determined by a timer 65. This is necessary in order to provide a recognizable rest period, undisturbed by line noise, for the office receiving circuitry. Those skilled in the art will recognize that line noise would be produced if the transmitter were immediately turned off at the end of the message supplied from ring counter 56. Timer 65 responds to the time out position of ring counter 56 by demarcating a predetermined interval, at the end of which an output signal is supplied to a third input of OR circuit 58. Again, OR circuit 58 provides an output which operates pulse generator 59 to step ring counter 56, removing data from the time out position of the ring counter. At this juncture, the ring counter is empty. An automatic start circuit 66 monitors all positions in the ring counter, and when no bit exists in any position of the ring counter, the automatic start circuit inserts a bit into the rest position of the ring counter. Thus, if an extra bit should for any reason enter the counter, it would be eliminated in one complete cycle of the ring counter. Moreover, each insertion of a bit into the rest position of the ring counter reestablishes the turn off signal to FSK transmitter 60.

To briefly recapitulate operation of transmitting circuitry 50 of the field station, rest detector timer 51 detects the roll call reset signal, which comprises a long "E" pulse from clock 14, and sets flip-flop circuit 52. This clears the count from "roll call" counter 54. The next mark or space pulse resets flip-flop circuit 52, which presets "roll call" counter 54 to a predetermined count, such as the count of three, at which count the first field location is to answer. Thus, three clock pulses ensue before an output pulse is produced by the "roll call" counter. Presence of a bit in the rest position of ring counter 56 fulfills one input of AND circuit 57, while output from the "roll call" counter fulfills the other input of AND circuit 57. Thus an output from AND circuit 57 produces an output from OR circuit 58 which drives pulse generator 59, causing ring counter 56 to step. The bit stored in the rest position of the ring counter. Removal of the bit from the rest position removes the turn off signal of FSK transmitter 60, turning the transmitter on. Moreover, an output is produced by the message position of ring counter 56 which triggers read-in circuits 63. The station address code and function relay outputs are supplied through the read-in circuits to shift register 61. Simultaneously, message length counter 64 is preset to a count of thirty-one. Since the encoder is not initially set, as the message is shifted through shift register 61, the first bit supplied to FSK transmitter 60 is a space. As the message continues to be shifted through shift register 61 to the encoder, the resulting code produced thereby is supplied in the form of marks and spaces to FSK transmitter 60, which produces frequency shifted pulses on the line.

The end of the message transmitted by transmitter 60 is characterized by an output from message length counter 64, which causes ring counter 56 to step into the time out position. This removes prime current $P_2$ from shift register 61 and encoder 62. Removal of the prime current from the encoder causes transmitter 60 to transmit center frequency for a period of time determined by timer 65, so that the office can recognize a rest period without disturbance by line noise.

After timer 65 times out, an output originating therefrom is supplied through OR circuit 58 to pulse generator 59, which empties ring counter 56 by shifting data out of the time out position. However, automatic start circuit 66 monitors each position in ring counter 56, and when no bit is detected anywhere in the ring counter, the automatic start circuit inserts a bit into the rest position. This reestablishes the turn off signal to transmitter 60.

Receiving circuitry 70 is situated at the control office for the purpose of receiving signals from each of the field stations controlled by the transmitting circuitry of the control office. Signals are received by a frequency shift keying receiver 71, tuned to a center frequency $f_2$, which produces mark and space outputs in response to the received signals. The received signals originate from each of the field stations sequentially, in accordance with a preselected priority, with a time interval between messages from each station equivalent to the time required to generate three successive bits.

The mark and space outputs of FSK receiver 71 are supplied to an OR circuit 72, which thus reconstructs the clock signal. In addition, each mark bit is supplied to a pulse generator 73 and produces respective output pulses therefrom. Each of these output pulses is supplied to a receive shift register 74, and is shifted along by an advance driver circuit 75 which in turn is driven by the reconstructed clock pulses supplied from OR circuit 72.

When a field station responds to its "roll call" counter by turning on the field station FSK transmitter, spurious outputs are initially produced. However, these spurious outputs are ignored by FSK receiver 71 because they never constitute more than 60% of the width of a true normal coding pulse in the system. Therefore, since the first coding pulse transmitted from the field station is always a space followed by a mark representing the tag bit, each space pulse is supplied to a valid space timer circuit 76 from FSK receiver 71 through an AND circuit 77, wherein each space pulse comprises a first input to the AND circuit. Output of a flip-flop circuit 78, when in the set condition, comprises a second input to AND circuit 77. The valid space timer times each pulse applied thereto, so that an output is produced only after a pulse of predetermined duration has been applied, setting a flip-flop circuit 79 and resetting flip-flop circuit 78. In this fashion, the first valid space pulse is separated by the valid space timer circuit, and spurious signals are rejected.

Following the first valid space pulse, the tag bit and the remainder of the coded message transmitted from the transmitting field station enter FSK receiver 71 and are supplied to shift register 74. When the tag bit arrives in the end, or tag, position of shift register 74, a station shift register 80 and a station address check counter 81 are each advanced to the next position. This occurs through circuitry described below.

Station shift register 80 and station address check counter 81 are driven in unison by an advance driver circuit 83, comprised of circuitry similar to that of advance driver 34 in field station transmitting circuitry 30. Station register 80 and station address check counter 81 are reset to indicate reception from the first field station by a pulse generator 84, which in turn is driven by a flip-flop circuit 85 when in the reset condition. Flip-flop circuit 85 is reset by a reset pulse timer circuit 86 upon detection by the timer circuit of a long duration "E" pulse produced by clock 14 in the control office transmitting circuitry. Outputs from station readout circuitry 82 and station address check counter 81 are supplied respectively to first and second inputs of a two input OR circuit 87. Output of OR circuit 87 supplies a set signal to flip-flop circuit 85, which responds by supplying a hold signal to clock 14 of the control office transmitting circuitry. This hold signal maintains clock 14 in a steady "E" output condition. Once the station shift register 80 and station address check counter 81 are reset, each output pulse produced by advance driver 83 advances register 80 and counter 81 by a single step or count, until the maximum step or count is reached, at which time either or both inputs to OR circuit 87 are fulfilled, flip-flop circuit 85 is set, and reset pulse timer 86 detects a lone "E" pulse produced by clock 14, thereby resetting flip-flop circuit 85 and causing reestablishment of a step, or count, in shift register 80 and station address check counter 81 representing receipt of a message from the first field station in the roll call.

After each message is received by the control office, there is a pause of duration equal to three consecutive bits, as previously explained. This pause is detected by a line rest timer circuit 88 which responds to output of OR circuit 72. Whenever a pause of duration equal to approximately one and one-half consecutive bits is received, OR circuit 72 provides an output which sets flip-flop circuit 78, thus fulfilling both one of the inputs to AND circuit 77, as previously described, and a first input to an AND circuit 89. In addition, the pulse produced by flip-flop circuit 78 upon becoming set is differentiated by a differentiator circuit 90 and supplied to a first input of an OR circuit 91 and a first input of an OR circuit 92. A second input to OR circuit 91 is supplied from the first half of the final stage of receive shift register 74. This shift register output is designated an early tag, since it represents an output by the tag bit immediately prior to arrival of the tag bit in the second half of the final stage of receive shift register 74. Output of OR circuit 91 resets flip-flop circuit 79, which thereupon removes prime current $P_3$ from receive shift register 74. Removal of this prime current prevents further transfer of bits from the second half of each shift register stage to the first half of the next successive stage. Hence, whenever a tag bit is in the first half of the final stage of receive shift register 74, or whenever flip-flop circuit 78 is set, flip-flop circuit 79 is reset, thereby removing prime current $P_3$ from receive shift register 74 in the manner previously described.

Flip-flop circuit 78, when in the set condition, fulfills a first input to a three input AND circuit 93. A bit-for-bit comparison of the address contained in the message within receive shift register 74 is made with the address held within station address check counter 81 by an address check circuit 94. If the addresses compare, a verification output is supplied by address check circuit 94 to a second input of AND circuit 93. The second half of the final stage in receive shift register 74 provides a third input to AND circuit 93 whenever the tag bit reaches this position within the shift register. When all three inputs to AND circuit are fulfilled, an accept output signal is supplied from the AND circuit to a trigger generator 95.

Indications received at the control office from the network of field stations responsive thereto are supplied to a memory matrix 96. This matrix preferably comprises that described in Arthur W. Wetmore application U.S. Ser. No. 451,243, filed Apr. 27, 1965. A plurality of station driver circuits 97 provide input signals to the matrix rows, while a plurality of bit driver circuits 98 provide input signals to the matrix columns. The station driver circuits are conditioned by station register 80 through station readout circuit 82 for the particular station whose message is being received. The bit driver circuits are conditioned by the message contained in receive shift register 74 through an indication readout circuit 99 which fulfills one input of each of a plurality of two input AND circuits, such as AND circuits 100 and 101. The second input to each of AND circuits 100 and 101 is fulfilled by presence of the tag bit in the second half of the final stage of receive shift register 74. The output of trigger generator 95 is supplied to station driver circuits 97 and bit driver circuits 98, so that when an accept pulse is produced by AND circuit 93, the trigger generator triggers both the station drivers and bit drivers, thereby updating memory matrix 96 to the latest indication information from the field station whose message has been received. As described in the aforementioned Wetmore application U.S. Ser. No. 451,243, the station driver circuits erase the data formerly stored in the row corresponding to the station whose message has been received, and the bit driver circuits supply an input to each of the columns of the memory matrix, in parallel, to establish a new message in the row corresponding to the aforementioned field station. Matrix 96 is preferably capable of handling twenty-four bits of function indication data, so that if but five bits are required for addressing and code checking, one bit required as the initial space pulse, and one bit required as the tag bit, the entire amount of function data contained in each indication message may be stored in the matrix. Less bits are required for the indication message address than for the control message address, since indication data, being continually diplayed, is less critical than control data, which may be furnished at one time only. The indication bits are supplied in parallel to the matrix from bit driver circuits 98. In addition, the bit driver circuits themselves are driven in parallel from receive shift register 74, with each separate bit being supplied from the receive register to a separate two input AND circuit along with the tag bit output from receive shift register 74.

When flip-flop circuit 78 is operated to its set condition, an output is supplied therefrom to a timer circuit 102, starting the timer. After an interval demarcated by timer 102, the timer produces an output which clears receive shift register 74, conditioning the register for acceptance of the next message from the next answering station. It should be noted that if a message is not accepted due to lack of an output signal from address check circuit 94 caused by either a disparity between the address in station address check counter 81 and that in receive register 74, absence of a tag bit in the second half of the final position of receive shift register 74, or failure of line rest timer circuit 88 to detect a line rest condition, the function information in receive shift register 74 is not supplied to memory matrix 96, and therefore is destroyed when the clear pulse for receive shift register 74 is generated by timer circuit 102.

Since station shift register 80 and station address check counter 81 are each advanced by reception of each message from a field station, it would be possible for the station shift register and station check counter to get out of step in the event a field station should fail to answer or a particular roll call assignment not be used. This condition would cause all following station messages for the particular roll call in progress to be rejected by address check circuit 94, destroying the utility of the entire system. To obviate such condition, a message length shift register 103 is provided for the purpose of simulating a true received message. In the preferred embodiment, the message length shift register comprises thirty-four positions with an output supplied from position fourteen, which would be the approximate center of a true received message, to a second input of two input OR circuit 92.

One input of a two input AND circuit 104 is driven by "E" pulses from clock 14 of the control office transmitting circuitry, while the other input is fulfilled by flip-flop circuit 78 when in the set condition. Output from AND circuit 104 is supplied to the input of a pulse generator 106. The AND circuit 104 receives a signal from flip-flop circuit 78 in order to prevent output pulses from driving pulse generator 106 when flip-flop circuit 78 is in the reset condition. Each output pulse produced by pulse generator 106 is properly shaped for resetting message length shift register 103. It should be noted that message length shift register 103 is also reset by a feedback circuit coupled from the final stage of the shift register back to the initial stage. Thus, whenever a bit in shift register 103 reaches the final position, the shift register automatically resets.

When the initial bit in message length shift register 103 reaches the fourteenth position, the shift register fulfills the second input of OR circuit 92. Output from OR circuit 92 drives a one-shot multivibrator 107, which thereupon fulfills the second input to AND circuit 89. Output from AND circuit 89 is supplied to a first input of an OR circuit 108, the second input of which is fulfilled by output from the second half of the final position of receive shift register 74. OR circuit 108 thus supplies input signals to advance driver circuit 83.

Under normal operating conditions, AND circuit 89 produces no output when the initial bit in message length shift register 103 reaches the fourteenth position, since this condition occurs during an interval in which a message is being received. During this interval, flip-flop circuit 78 is in the reset condition, so that the first input to AND circuit 89 is unfulfilled. If, on the other hand, a field station fails to answer, flip-flop circuit 78 remains in the set condition, since no indications are received, and therefore the space output signals from FSK receiver 71 are absent, as well as the mark signals. Hence, AND circuit 77 fails to provide a valid space pulse to valid space timer 76. Therefore, when an output signal is derived from the fourteenth position of message length shift register 103, both inputs to AND circuit 89 are fulfilled, thereby actuating advance driver circuit 83 to advance station shift register 80 and station address check counter 81, thus bringing the roll call system back into step. In addition, since pulse generator 106 fails to supply a clear-reset pulse to message length shift register 103, the bit in the message length shift register is reset into the first position through the shift register feedback loop. It should be noted, however, that the feedback loop does not supply a clear pulse to the shift register when the shift register is reset. This function is accomplished by pulse generator circuit 106, which supplies clear, as well as reset pulse, during reception of an indication message, thus assuring that there is only one bit in the message length shift register at any given time. Hence, if there should be any appreciable propagation delay anywhere in the system, the bit in shift register 103 is automatically shifted to correct for the delay.

A roll call reset pulse is sent out to all field stations from the control office when the bit stored in station shift register 80 is advanced to a position corresponding to the last field station in the roll call. Hence, when station shift register 80 advances to this position, an output is supplied through station readout circuit 82 to one input of OR circuit 87, thereby setting flip-flop circuit 85. Alternatively, a roll call reset pulse is sent to all field stations in the event station address check counter 81 detects receipt of a message from the final field station, since the other input of OR circuit 87 is thus fulfilled, setting flip-flop circuit 85. When in the set condition, flip-flop circuit 85 holds clock 14 of control office transmitting circuitry 10 in the "E" mode. This causes FSK transmitter 17 to transmit a constant center frequency, which is detected by the rest detector timers such as rest detector timer 51, in the receiving circuitry of each field location. The length of the roll call reset pulse is determined by reset pulse timer 86, which resets flip-flop circuit 85, thereby removing the hold signal from clock 14 to permit the clock to again generate "O" and "E" pulses. Moreover, flip-flop circuit 85 also resets station shift register 80 and station address check counter 81 to zero through pulse generator circuit 84. It should be noted that if a roll call reset pulse is generated during transmission of a control message from the control office, the control office transmission is not disturbed, but merely delayed by the length of the roll call reset pulse. This is because the advance driver circuits are halted temporarily while clock 14 is in a hold condition, so that data stored in the shift registers and counters is merely retained therein throughout the entire duration of inactivity by the advance driver circuits.

To briefly recapitulate operation of control office receiving circuitry 70, mark pulses in the message received by FSK receiver 71 are supplied through pulse generator 73 to receive shift register 74, thus filling the shift register with the received message. Valid space timer circuit 76 detects the first space pulse in the received message and thereupon resets flip-flop circuit 78.

When the tag bit in the message arrives at the final position in receive shift register 74, one input to AND circuit 93 is fulfilled. Moreover, station shift register 80 and station address check counter 81 are each advanced to the next position, which should correspond to the field station from which the message was received. This is accomplished by operating advance driver circuit 83 through OR circuit 108. Line rest timer 88 detects the end of the message, and sets flip-flop circuit 78, fulfilling an input to AND circuit 93. Address check circuit 94 ascertains whether the address in receive shift register 74 corresponds to that manifested in station address check counter 81, and fulfills an input to AND circuit 93 when the addresses correspond. With all three inputs to AND circuit 93 fulfilled, trigger generator 95 responds by actuating station driver circuits 97 and bit driver circuits 98 to transfer the newly received message function data into memory matrix 96. The particular one of the station driver circuits corresponding to the field station having originated the message, is actuated by station readout circuit 82 in response to the position of a binary bit in station shift register 80. Bit driver circuits 98 are driven in parallel from indication readout circuit 99, which is connected in parallel to receive shift register 74. Thus, one station driver circuit erases the data stored in a row of memory matrix 96, while bit driver circuits 98 supply new data through the columns of the memory matrix to the individual cores in the erased row of the matrix.

In the event a field station fails to respond to the roll call, station shift register 80 and station address check counter 81 may fall out of step with the address supplied to receive shift register 74. Because this would cause all subsequent field station messages within that particular roll call to be rejected by the address check circuit, message length shift register 103 simulates a true received message and thereby obviates this situation. Thus, at position 14 in the message length shift register, an output is produced which advances the station shift register and the station address check counter in the event flip-flop circuit 78 remains in the set condition, indicating that a message is not being received. Under such circumstances, the bit is returned from the final stage of shift register 103, which is the thirty-fourth position, to the initial position through a feedback loop. When the bit thus arrives at the initial position of shift register 103, the time allotted to the omitted message has elapsed, and the shift register is in proper condition to respond to a message omission from the next field station in the roll call. However, when a message is being received, output from the fourteenth position of message length shift register 103 is ignored by the system, since flip-flop circuit 78 is then in the reset condition, leaving the first input to AND circuit 89 unfulfilled.

The office receiving circuitry is well protected against receipt of incorrect messages. For example, assume an extra mark pulse has appeared in the address portion of the indication message during reception of this message by the control office receiving circuitry. In all respects, operation of the office receiving circuitry is identical to that previously described, until the tag bit reaches the second half of the final stage of receive shift register 74. At this juncture, output from the second half of the final stage of shift register 74 advances the count in station address check counter 81, but due to the error of the extra mark in the address stored in shift register 74, address check circuit 94 provides no output. As a result, only two out of the three inputs to AND circuit 93 are fulfilled, and no accept output is supplied from AND circuit 93 to trigger generator 95. Moreover, as with an accepted message, timer 102 is started when flip-flop circuit 78 is set. The output produced by the timer then erases the message in receive shift register 74, so that the message is never supplied to storage. Moreover, the pulse generated by timer 102 clears the tag bit out of receive shift register 74, causing advance driver circuit 83 to transfer the single bit in station shift register 80 to the next stage therein, thereby generating the address for the next field station and establishing this address in station address check counter 81.

In the event a message received by the receiving circuitry of the control office lacks a bit in the center of the message, there are insufficient drive pulses in the message to advance the tag bit to the second half of the final stage of receive shift register 74. Hence, the early tag and the tag outputs are never produced by receive shift register 74. In this case, with flip-flop circuit 78 having been set at the start of the message, as previously described, one-shot multivibrator 107 is triggered, thus producing one cycle of operation of advance driver circuit 83. This advances both station shift register 80 and station address check counter 81 to the next station. Since in this case, only the line rest input was present at AND circuit 93, no accept trigger could be produced therefrom. Thus, the message from the field station, lacking a bit, is cleared out of the system without being placed in storage. Since the early tag output is absent, flip-flop circuit 79 is reset through differentiator circuit 90 by the setting of flip-flop circuit 78. Hence, prime current $P_3$ is removed from receive shift register 74.

Another type of possible error is the addition of extra bits into the message. In such instance, since the early tag output resets flip-flop circuit 79, which in turn removes prime current $P_3$, the extra pulse or pulses in the message produce additional pulses from advance driver circuit 83 which act to clear receive shift register 74 because there is no prime current to sustain further serial shifting in the register. Again, the station shift register and station address check counter are advanced by one station, so that the entire system remains in synchronism.

Figure 2:
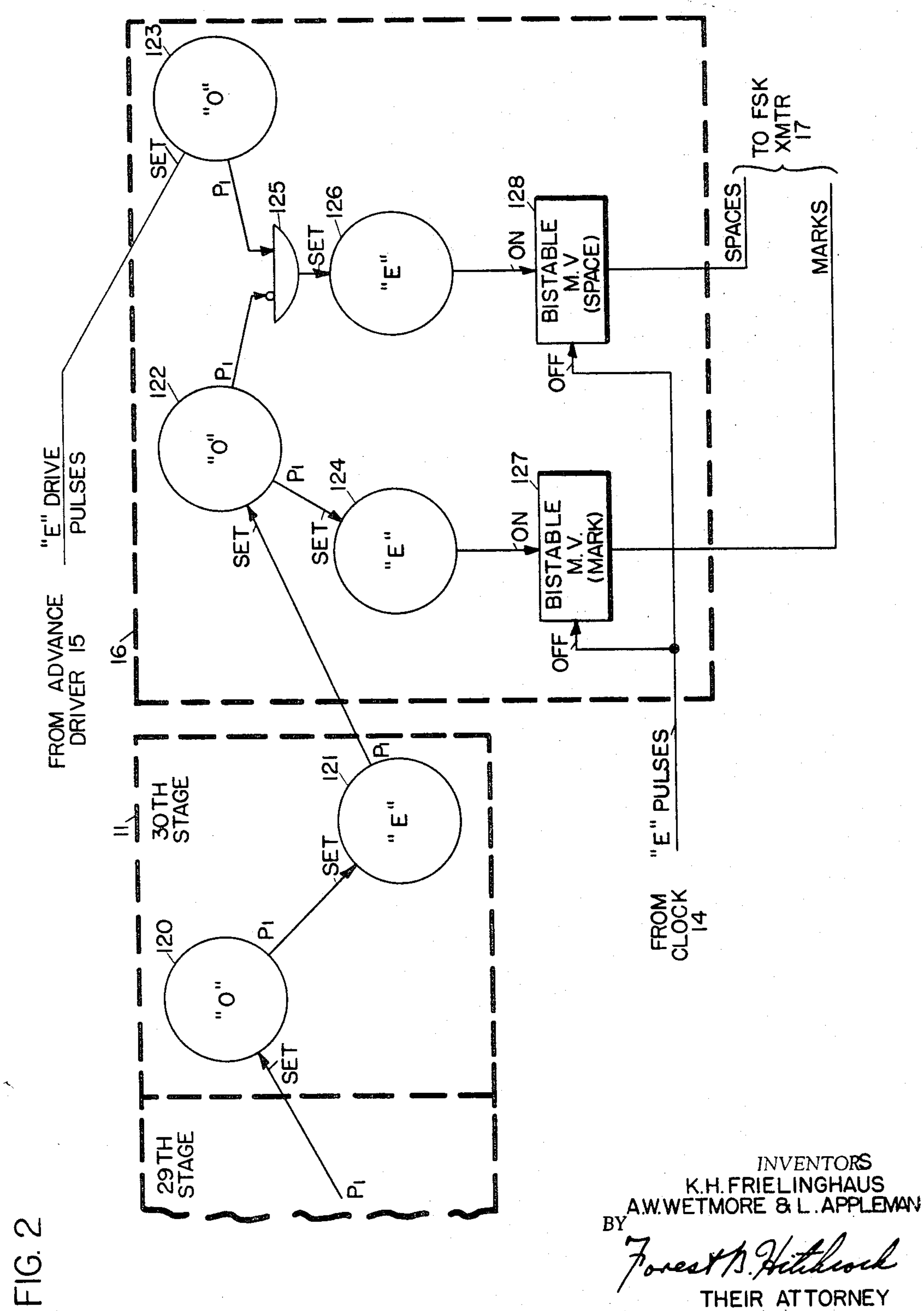
FIG. 2 is a functional block diagram of preferred configuration of the encoder used in the control office transmitting circuitry and the field station transmitting circuitry.

FIG. 2 is a block diagram illustrating a preferred circuit configuration for encoder 16 of control office transmitting circuitry 10. The thirtieth stage of shift register 11 is shown comprising a first core 120 driven by "O" output pulses from advance driver circuit 15 and a second multiaperture core 121 driven by "E" output pulses from advance driver circuit 15. Output pulses produced by core 121 are supplied to a multiaperture core 122, for the purpose of setting the core. Core 122 is driven by "O" output pulses of advance driver 15, and is set by "E" drive pulses produced by advance driver 15. Output pulses produced by core 122 are used for setting a multiaperture core 124 in the encoder, the output of which turns on a bistable multivibrator 127. In addition, output pulses from both cores 122 and 123 are supplied to a HALF EXCLUSIVE OR circuit 125, which supplies pulses for setting a multiaperture core 126 whenever pulses are produced by multiaperture core 123 in the absence of pulses from multiaperture core 122. The HALF EXCLUSIVE OR circuit may be constructed solely of pattern windings on cores 122, 123 and 126, in a manner well known in the art.

Multiaperture core 126, when set, provides output pulses to a bistable multivibrator 128 for the purpose of turning the multivibrator on. Both cores 124 and 126 are driven by "E" output pulses from advance driver 15.

Output energy from bistable multivibrator 127 constitutes a mark, while output energy from bistable multivibrator 128 constitutes a space. Both mark and space pulses are supplied to FSK transmitter 17. Both bistable multivibrators 127 and 128 are turned off by each individual "E" pulse produced by clock 14 of the office transmitting circuitry. It should be noted that each core of FIG. 2, with the exception of cores 124 and 126 is capable of producing an output only during presence of prime current $P_1$, which is controlled by flip-flop circuit 13 of the office transmitting circuitry.

In operation, assume a binary ONE is established in core 121 upon production of an "O" output pulse from advance driver 15. The set condition of a core signifies that a ONE is stored therein, while the clear condition signifies that a ZERO is stored therein. The next pulse produced by the advance driver circuit, which is an "E" pulse, sets core 122. Simultaneously, core 123 is set by the same pulse. The next pulse produced by advance driver circuit 15, which is an "O" pulse, fulfills both inputs to HALF EXCLUSIVE OR circuit 125 so that no output is produced therefrom. Hence, core 126 remains in a clear condition. However, an output pulse is also supplied to core 124, thereby setting the core. This core is non-destructively read out, thereby turning bistable multivibrator 127 on immediately upon becoming set. This produces a mark output to FSK transmitter 17. It should be noted that if the ONE should happen to be the tag bit, the equivalent of one and one-half clock cycles must occur between the time data is supplied to register 11 and the time encoder 16 provides a tag output; that is, the clock must provide, in order, an "O," "E" and "O" pulse, prior to production of the tag output by the encoder. Hence, to permit transfer of the entire message from shift register 11 to the transmitter, message length counter 17 of FIG. 1 must be preset to thirty-one, rather than thirty. The next "E" pulse from advance driver 15 clears core 124, removing the output therefrom. In addition, the "E" pulse from clock 14, which is of greater duration than the "E" pulse produced by advance driver circuit 15, turns bistable multivibrator 127 off, removing the mark signal from FSK transmitter 17.

In the event the bit following the ONE is a ZERO, the ZERO is transferred to core 120 when the ONE is transferred from core 121 to core 122. When the ONE in core 122 is transferred to core 124, the ZERO is transferred from core 120 to core 121. The next "E" pulse produced by advance driver circuit 15 clears care 124 and transfers the ZERO to core 122. Core 122 thus remains in the clear condition. Simultaneously, core 123 is set by the same "E" pulse. The next "O" pulse produced by advance driver circuit 15 leaves core 124 in the clear condition, since core 122 was previously clear. However, core 126 is thereupon set, since no output pulse is produced by core 122 simultaneous with an output pulse from core 123 when an "O" pulse is produced by advance driver circuit 15. At this time, both inputs to HALF EXCLUSIVE OR circuit 125 are fulfilled, and core 126 is thereupon set. Bistable multivibrator 128 is thus immediately turned on, since core 126 is non-destructively read out, resulting in a space pulse being supplied to FSK transmitter 17. The next "E" pulse produced by advance driver circuit 15 clears core 126, and the longer "E" pulse produced by clock 14 turns bistable multivibrator 128 off. In the absence of either a space or mark input to FSK transmitter 17, the transmitter output remains at its center frequency. It should be noted that encoder 62 of field station transmitting circuitry 50 is similar in construction and function to that of encoder 16.

Figure 3:
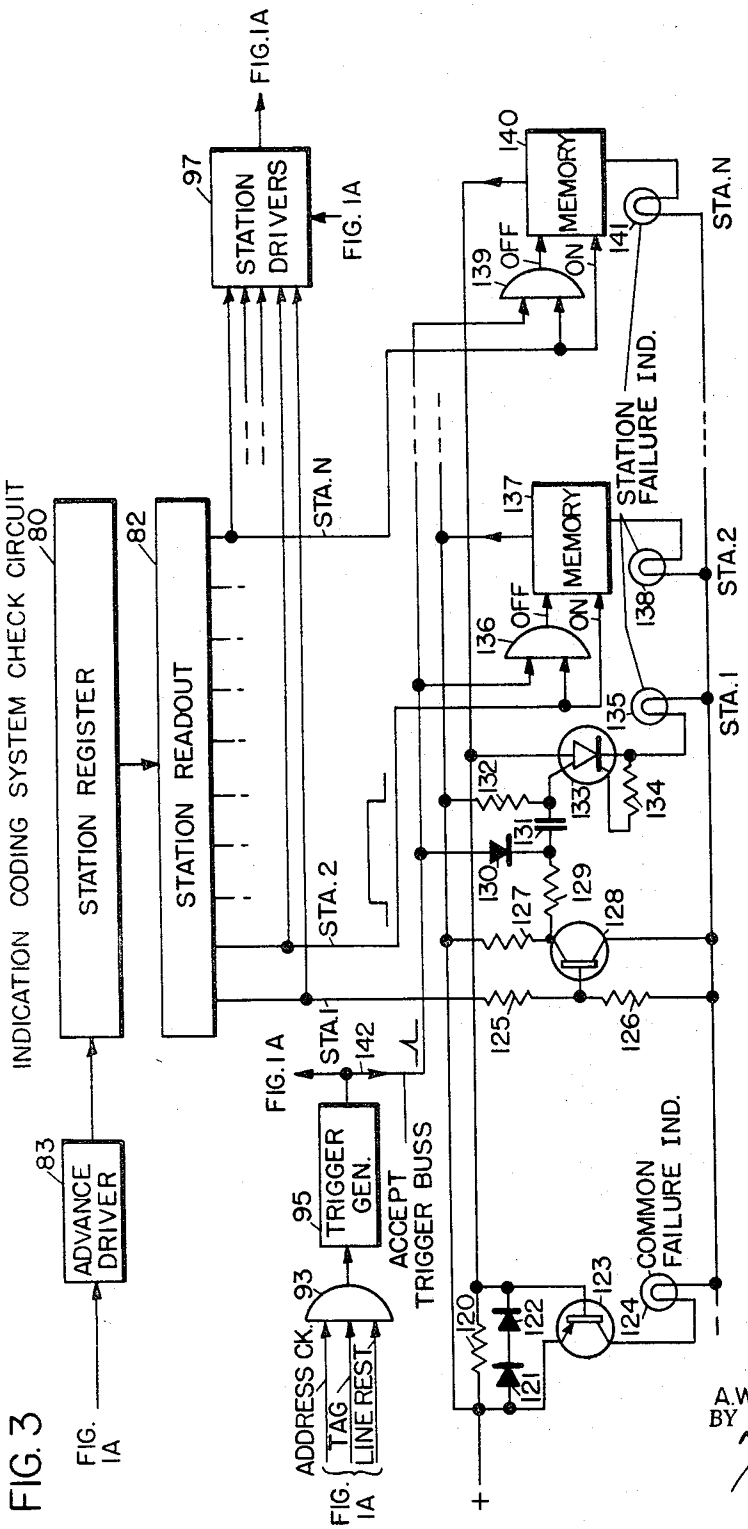
FIG. 3 is a circuit diagram of the check circuit organization used in the system of the present invention.

With reference to FIG. 3, the operation of the check circuit will be discussed. Certain elements from FIGS. 1A and 1B are shown in block form using the same reference characters so as to show the relation of the check circuit to the rest of the system. The check circuit derives its input from the station register 80 through the station readout element 82 and the trigger generator 95. The check circuit consists of a memory element and associated failure indication lamp for each station of the indication coding system. The check circuit for station 1 has been shown in detail. Transistor 128 inverts and amplifies the station 1 signal from the station readout 82. The output of the station 1 position of the station readout 82 goes positive at the instant when the tag bit arrives in the end position of the receive register 74, because this causes the single bit in the station register 80 to be advanced to the station 1 position. This positive signal causes transistor 128 to be switched "on," which causes its collector to drop to the negative bus potential. This negative step voltage is coupled to the anode gate of the silicon controlled switch 133 through resistor 129 and capacitor 131. Since a negative pulse at the anode gate of a silicon controlled switch (SCS) will turn it "on," SCS 133 will now turn "on," causing current to start to flow through the station 1 indicator lamp 135. Since an SCS is a bistable device, it will continue to remain in the "on" state until turned "off." During this same time the three inputs to the three input AND gate 93 are being established. The tag bit in the end position of the receive register 74 produces the tag input into AND gate 93. The address check input will be present if the address of the incoming indication message checks with the address now held by the station address check counter 81. The line rest input is produced last, when the line rest timer 88 detects the end of the incoming message. Thus, when the three inputs of the AND gate 93 are complete, it will cause the trigger generator to produce an accept trigger pulse which triggers the station driver 97 and bit drivers 98. The accept trigger pulse also is present on the accept trigger bus 142. This positive pulse on the accept trigger bus forward biases diode 130 and is, therefore, coupled through capacitor 131 as a positive pulse at the anode gate of SCS 133. A positive pulse on the anode gate of an SCS turns it "off"; therefore, the current through failure indicator lamp 135 will cease. Since the turn "on" of SCS 133 was only about five milliseconds before the accept pulse or turn "off" of SCS 133, insufficient time was available for illuminating the failure indicator 135. The accept pulse was not coupled into the other SCS's since their coupling diodes were all held in a reversed biased condition because their station line inputs were not energized. This logic is shown by the two input AND gates 136 and 139.

Figure 4:
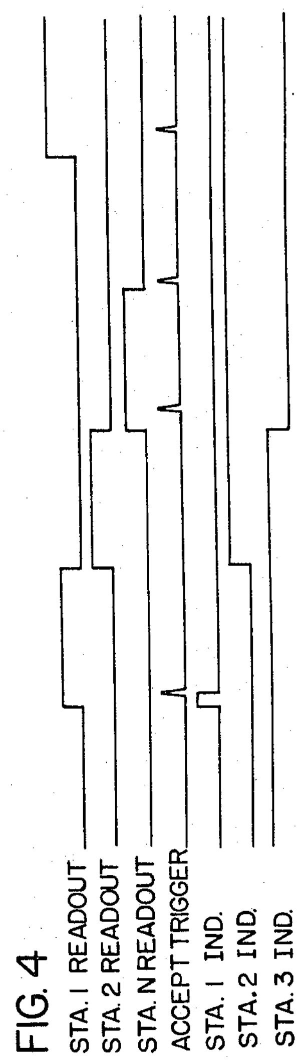
FIG. 4 shows a series of wave forms illustrating the operation of FIG. 3 above.

It can now be seen that if the three inputs to AND gate 93 were not present, an accept trigger pulse would not be generated and the particular answering station which did not get its message accepted would now have its associated check SCS and failure indicator left in its "on" condition. The absence of an accept trigger pulse is the result of one, two or three of the inputs to the AND gate 93 not being present. This is a result of one of many reasons; such as the field station failing to answer, or the field station sending an improper message. It could also be line disturbances changing the indication message, or the message being improperly received or improperly handled by the receiving system. Therefore, it can be seen that the failure indication lamps will immediately indicate the failure to accept an indication message from any one station. It should also be noted that when the failure corrects itself or is corrected, the failure indicator lamp will automatically reset itself, because the first accept pulse after a failure will turn "off" the SCS of the affected station and extinguish its associated failure indicator lamp. These three operations are illustrated by the waveforms in FIG. 4.

Also shown is a common failure indication lamp which is turned "on" if any single station failure indicator lamp is "on." This is accomplished through a load sensing circuit consisting of resistor 120 and diodes 121 and 122. If no SCS is turned "on" no current flows through R120 and transistor 123 remains turned off. If one or all check circuit SCS's are turned on, sufficient current flows through resistor 120 to forward bias the base of transistor 123 and turn it on. Diodes 121 and 122 maintain a maximum voltage drop across resistor 120 by virtue of their constant forward voltage drop. This prevents excessive base current from being drawn from transistor 123. By time delay circuitry known to anyone knowledgeable in the state of the art, the common failure indicator could be illuminated only after a failure has persisted for a predetermined length of time. In this way single messages not being accepted due to line circuit disturbances could be ignored.

Thus, there has been shown a duplex, solid-state code communication system comprising a plurality of field stations receiving control signals selectively from a control office and providing indication information to the control office sequentially in a roll call fashion upon detection of a particular transmission condition from the control office. The entire system requires but a single clock for regulating the rate of operation, and the control office always associates a received message with the proper originating field station, even when one or more of the field stations become inoperative. Moreover, the system automatically rejects messages containing either more or less than a predetermined number of bits.

Since all timing elements such as the roll call rest detector 51 and line rest detector 88 time the center frequency "on" time, if this time is maintained constant at all times, the high or low frequency time can be lengthened to any extent without altering the operation of the system. By altering the clock 14 in the above mentioned manner, it is possible to slow the speed of operation of the system even down to a handstep rate which allows for easy system operation checking.

Although but one embodiment of the invention has been described, it is to be specifically understood that this form is selected to facilitate disclosure of the invention rather than to limit the number of forms which it may assume; various modifications and adaptations may be applied to the specific form shown to meet requirements of practice, without in any manner departing from the spirit or scope of the invention.

What is claimed is:

1. A code communication system comprising means at a central office for transmitting coded messages, each said message including a function portion and a distinctive address portion, a plurality of field stations, utilization apparatus coupled to said field station, each said field station being responsive to a particular one of said distinctive address portions of said coded messages and supplying the function portion of the message to the utilization apparatus, means at each of said field stations responsive to a distinctive signal from said transmitting means for cyclically transmitting in a predetermined order indication messages from each of the field stations representative of the condition of said utilization apparatus, each said indication message including a function portion and a distinctive address portion, a plurality of storage means at said central office, each said storage means associated with a separate field station respectively, receiving means at said central office responsive to the address portions of the messages transmitted by said field stations for selectively storing the function portion of each message in an individual portion of said storage means, said receiving means including means for counting the number of indication messages transmitted by the field stations, means at said central office responsive to the receiving means for checking said number of indication messages for correspondence with the address portion of each received indication message prior to permitting application of the function portion of each received indication message to said storage means, means at said central office responsive to the receipt of a predetermined number of indication messages for initiating the transmission of said distinctive signal, timing means monitoring intervals between the consecutive indication messages received from said field stations for selectively supplying to a storage means subsequent to said individual portion of said storage means the function portion of each succeeding indication message when any one of said intervals exceeds a predetermined duration, and wherein said distinctive signal is an interval of predetermined duration during which no code is transmitted, and the initiation of said distinctive signal delays the transmission of control messages for a corresponding interval.

2. A code communication system comprising means for transmitting coded messages, each said message including a function portion and a distinctive address portion, a plurality of field stations, utilization apparatus coupled to said field stations, each said field station being responsive to a particular one of said distinctive address portions of said coded messages and supplying the function portion of the mesage to the utilization apparatus, counter means at each of said field stations preset to provide an output signal at individually selected counts, indication message producing means at each of said field stations coupled to the counter means at said respective field stations, clock pulse generating means coupled to each of said counter means, said counter means all being started simultaneously upon receipt of a distinctive signal from said clock pulse generating means and driven in unison therefrom, a plurality of storage means, each said storage means associated with a separate field station respectively, and means responsive to completion of output pulses from each of said indication message producing means for applying the message to the respective storage means.

3. The code communication system of claim 2 including timing means coupled to said indication message producing means and monitoring intervals between consecutive indication messages for selectively supplying to a storage means subsequent to said storage means associated with said separate field station repectively the function portion of each succeeding indication message when any one of said intervals exceeds a predetermined duration.

4. In a code communication system including a shift register having a plurality of stages for storing data bits to be transmitted and means for generating successive pairs of clock pulses of alternate phase, encoder means responsive to the final stage of said shift register for producing first and second output pulse trains, said encoder means comprising first and second magnetic core means each capable of assuming a first or second remanent magnetic flux condition, said first magnetic core means being coupled to the final stage of said shift register and operable to the first remanent magnetic flux condition by output from the final stage of said shift register, said second magnetic core means being operable to said first remanent magnetic flux condition in response to one phase of said clock pulses, said first and second magnetic core means being driven by the other phase of said clock pulses to said second remanent magnetic flux condition, means responsive to said first core for providing the first output pulse train when said first core is driven by said other phase of said clock pulses during said first remanent magnetic flux condition, and HALF EXCLUSIVE OR circuit means responsive to said first and second cores for providing the second output pulse train when said first and second cores are driven by said other phase of said clock pulses at a time when said first core is in said second remanent magnetic flux condition and said second core is in said first remanent magnetic flux condition.

5. A code communication system comprising a control office, said control office including a transmitting shift register, a receiving shift register and a clock pulse generator drivingly coupled to said transmitting and receiving shift registers, a plurality of field stations, each said field station including a roll call counter coupled to said transmitting shift register and preset to provide an output upon receipt of a predetermined number of pulses from said transmitting shift register, code transmitting means situated at each of said field stations and coupled to said roll call counter at the respective field station for initiating an indication message including a function portion and a distinctive address portion upon receipt of an output from said roll call counter, said code transmitting means being operated at a rate determined by said counter, means coupling said code transmitting means at each of said field stations to said receiving shift register, storage means, station counting means at said control office responsive to said code transmitting means at each of said field stations for counting the number of indication messages produced by the field stations, gating means coupling said receiving shift register to said storage means, and checking means responsive to said receiving shift register and said station counting means for opening said gating means to allow transfer of the function portion of said indication message to said storage means when the address portion of said indication message agrees with the count of said station counting means.

6. The code communication system of claim 5 including timing means coupled to said code transmitting means and monitoring intervals between consecutive messages received from said field stations for advancing the count in said station counting means by a predetermined amount whenever one of said intervals exceeds a predetermined duration.

7. The code communication system of claim 6 wherein said storage means includes a plurality of storage circuits, and said code communication system further includes means coupling said station counting means to said storage means for selectively conditioning one of said storage circuits in accordance with the count in said station counting means to accept data.

8. The code communication system of claim 1 wherein said checking means combines with said address responsive means to provide a distinctive output for each station, and check lamp means for each station controlled to illumination by said distinctive output for its station only if a continuing failure occurs for that station.

9. The code communication system of claim 1 including timing means coupled to said transmitting means for timing the intervals between each successive code pulse, said utilization apparatus at each field station and said receiving means at said central office being constructed to be uniformly responsive to said intervals and to be responsive to the message pulses between said intervals regardless of the lengths of such pulse.

References Cited

UNITED STATES PATENTS

| | | | |
|---|---|---|---|
| 2,945,915 | 7/1960 | Strip | 178—69 |
| 3,061,192 | 10/1962 | Terzian | 235—157 |

PAUL J. HENON, *Primary Examiner.*

I. S. KAVRUKOV, *Assistant Examiner.*